US011246039B2

(12) United States Patent
Li et al.

(10) Patent No.: US 11,246,039 B2
(45) Date of Patent: Feb. 8, 2022

(54) METHOD AND APPARATUS FOR SECURE MULTI-TERMINAL COOPERATIVE WORKING

(71) Applicant: HUAWEI TECHNOLOGIES CO., LTD., Guangdong (CN)

(72) Inventors: Ruihua Li, Shenzhen (CN); Hua Chen, Shanghai (CN); Dawei Huo, Shenzhen (CN); Wei Xiao, Shenzhen (CN); Jianfeng Xu, Shenzhen (CN); Heng Liao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/883,120

(22) Filed: May 26, 2020

(65) Prior Publication Data

US 2020/0288307 A1 Sep. 10, 2020

Related U.S. Application Data

(63) Continuation of application No. PCT/CN2018/116304, filed on Nov. 20, 2018.

(30) Foreign Application Priority Data

Nov. 27, 2017 (CN) .......................... 201711206282.0
Nov. 28, 2017 (CN) .......................... 201711217742.X (51) Int. Cl.
*H04L 29/06* (2006.01)
*H04W 12/55* (2021.01)
(Continued)

(52) U.S. Cl.
CPC .......... *H04W 12/55* (2021.01); *H04W 12/068* (2021.01); *H04W 12/08* (2013.01); *H04W 12/30* (2021.01)

(58) Field of Classification Search
CPC ... H04W 12/55; H04W 12/068; H04W 12/30; H04W 12/08
See application file for complete search history.

(56) References Cited

U.S. PATENT DOCUMENTS 7,130,807 B1 10/2006 Mikurak
8,819,445 B2 * 8/2014 Schrecker ........... H04W 12/068
713/185
(Continued)

FOREIGN PATENT DOCUMENTS

CN 101127987 A 2/2008
CN 102375947 A 3/2012
(Continued)

*Primary Examiner* — Hosuk Song
(74) *Attorney, Agent, or Firm* — Womble Bond Dickinson (US) LLP (57) ABSTRACT

This application provides a method for secure multi-terminal cooperative working, applied to a network on which a plurality of terminal devices perform cooperative playing and/or cooperative recording, where the plurality of terminal devices include a first terminal device. The method includes: determining, by the first terminal device, a security mechanism; obtaining, by the first terminal device, cooperative working information, where the cooperative working information is information played and/or recorded by the plurality of terminal devices; and performing, by the first terminal device, security processing on the cooperative working information based on the security mechanism. After obtaining the cooperative working information, the first terminal device performs security processing on the cooperative working information based on the security mechanism, so that a process other than the cooperative working process cannot access the cooperative working information, thereby ensuring security of the cooperative working information.

18 Claims, 5 Drawing Sheets

(51) Int. Cl.
    *H04W 12/08*     (2021.01)
    *H04W 12/30*     (2021.01)
    *H04W 12/06*     (2021.01)

(56) References Cited

U.S. PATENT DOCUMENTS

| | | | |
|---|---|---|---|
| 9,451,415 B2* | 9/2016 | Krishnaswamy | H04W 4/06 |
| 9,549,319 B1* | 1/2017 | Butler | H04W 24/08 |
| 9,966,991 B2* | 5/2018 | Terry | H04B 7/0413 |
| 2004/0078568 A1 | 4/2004 | Pham et al. | |
| 2012/0191980 A1* | 7/2012 | Kennedy | H04L 63/083 |
| | | | 713/183 |
| 2015/0172843 A1 | 6/2015 | Quan | |
| 2015/0271264 A1 | 9/2015 | Sun | |
| 2016/0117495 A1 | 4/2016 | Li et al. | |
| 2017/0332239 A1 | 11/2017 | Vaughn et al. | |

FOREIGN PATENT DOCUMENTS

| | | |
|---|---|---|
| CN | 102970589 A | 3/2013 |
| CN | 103218573 A | 7/2013 |
| CN | 103413095 A | 11/2013 |
| CN | 103533054 A | 1/2014 |
| CN | 104519034 A | 4/2015 |
| CN | 104580151 A | 4/2015 |
| CN | 104581834 A | 4/2015 |
| CN | 106375997 A | 2/2017 |
| CN | 106648997 A | 5/2017 |
| CN | 106961429 A | 7/2017 |
| CN | 107027066 A | 8/2017 |
| CN | 107070981 A | 8/2017 |
| CN | 107315947 A | 11/2017 |

\* cited by examiner

| When a first terminal device accesses a network, the first terminal device determines a security mechanism | — S201 |

| The first terminal device obtains cooperative working information, where the cooperative working information is information played and/or recorded by a plurality of terminal devices | — S202 |

| The first terminal device performs security processing on the cooperative working information based on the security mechanism, where the security mechanism is used to prohibit a process other than a cooperative working process from accessing the cooperative working information | — S203 |

METHOD AND APPARATUS FOR SECURE MULTI-TERMINAL COOPERATIVE WORKING

CROSS-REFERENCE TO RELATED APPLICATION

This application is a continuation of International Application No. PCT/CN2018/116304, filed on Nov. 20, 2018, which claims priority to Chinese Patent Application No. 201711206282.0, filed on Nov. 27, 2017 and Chinese Patent Application No. 201711217742.X, filed on Nov. 28, 2017. The disclosures of the aforementioned applications are hereby incorporated by reference in their entireties.

TECHNICAL FIELD

This application relates to the communications field, and in particular, to a method and an apparatus for secure multi-terminal cooperative working.

BACKGROUND

An on-net service is provided for a user by using a plurality of terminal devices, to implement cooperative and uniform experience, thereby freeing a single terminal device from a limitation in aspects, such as functions, performance, and processing capabilities. This processing manner is referred to as cooperative working. Information transferred during cooperative working is referred to as cooperative working information. For example, in a conference call scenario, recording files with different sound channels can be played by using a plurality of mobile phones at a same conference site, to implement a stereo playing effect; and a sound may be recorded by using a plurality of mobile phones at a same conference site, to improve a recording effect of a weak sound.

Cooperative working information is usually confidential information. However, in a multi-terminal cooperative working scenario, there is such a risk that played or recorded information is forwarded. One solution is: manually checking whether recording software has been installed on each terminal. However, various terminals usually belong to different users, and a user's privacy is invaded if a terminal is manually checked for whether recording software has been installed. In addition, even if recording software has been installed on a terminal, it does not mean that a user has recorded cooperative working information. Therefore, how to provide a method for secure cooperative working is a problem that currently needs to be urgently resolved.

SUMMARY

This application provides a method and an apparatus for secure multi-terminal cooperative working, to reduce a risk of disclosure of cooperative working information.

According to a first aspect, a method for secure multi-terminal cooperative working is provided, and applied to a network on which a plurality of terminal devices perform cooperative playing and/or cooperative recording, where the plurality of terminal devices include a first terminal device. The method includes: when the first terminal device accesses the network, determining, by the first terminal device, a security mechanism; obtaining, by the first terminal device, cooperative working information, where cooperative working information is information played and/or or recorded by the plurality of terminal devices; and performing, by the first terminal device, security processing on the cooperative working information based on the security mechanism, where the security mechanism is used to prohibit a process other than a cooperative working process from accessing the cooperative working information.

The plurality of terminal devices are at least two terminal devices, and the security mechanism is an operation that is defined by cooperative working software installed on the first terminal device and that needs to be performed during cooperative working. After obtaining the cooperative working information, the first terminal device performs security processing, for example, encryption or setting of access permission, on the cooperative working information based on the security mechanism, so that a process other than the cooperative working process cannot access the cooperative working information, thereby ensuring security of the cooperative working information.

In one embodiment, the performing, by the first terminal device, security processing on the cooperative working information based on the security mechanism includes: storing, by the first terminal device, the cooperative working information into a secure folder, where the secure folder is a folder that cannot be read by a process other than the cooperative working process, and the security mechanism is a manner of storing the cooperative working information.

In one embodiment, the secure folder is a folder with a random path, so as to further enhance the security of the cooperative working information.

In one embodiment, the method further includes: prohibiting, by the first terminal device, a process other than the cooperative working process from forwarding the cooperative working information.

Even if the cooperative working information is read by a process other than the cooperative working process, the first terminal device may further prevent disclosure of the cooperative working information by prohibiting a process other than the cooperative working process from forwarding the cooperative working information. For example, a process other than the cooperative working process may be prohibited from invoking a communications module of the first terminal device, thereby further enhancing the security of the cooperative working information.

In one embodiment, the performing, by the first terminal device, security processing on the cooperative working information based on the security mechanism includes: after a first frame in the cooperative working information is sent or played, immediately deleting the first frame.

The first terminal device may send the cooperative working information in a frame-by-frame sending manner, and delete a frame each time the frame has been sent; and the first terminal device may also play the cooperative working information in a frame-by-frame playing manner, and delete a frame each time the frame has been played. In this way, the first terminal device does not need to wait till the entire cooperative working information has been sent or played, to delete the cooperative working information, thereby reducing a time in which the cooperative working information is stored in the first terminal device and further reducing such a risk that the cooperative working information is forwarded.

In one embodiment, the method further includes: detecting, by the first terminal device, signal strength of the network; and when the signal strength of the network is less than or equal to a preset strength threshold, deleting, by the first terminal device, the cooperative working information.

Even if a communication fault occurs on the network currently and as a result a secondary device cannot decode information sent by another terminal device (for example, an exit command sent by a primary device), the foregoing embodiment can prevent the secondary device from leaving a cooperative working area while carrying the cooperative working information. In addition, the foregoing embodiment can further prevent the primary device from leaving the cooperative working area while carrying the cooperative working information, thereby enhancing the security of the cooperative working information.

In one embodiment, the method further includes: detecting, by the first terminal device, a distance between the first terminal device and a second terminal device, where the first terminal device is a secondary terminal device, and the second terminal device is a primary terminal device; and when the distance between the first terminal device and the second terminal device is greater than a preset distance threshold, deleting, by the first terminal device, the cooperative working information.

A secondary device may detect a distance between the secondary device and a primary device. When the distance between the secondary device and the primary device is relatively long, the secondary device deletes the cooperative working information and configuration information of the network immediately after determining that the secondary device has left the cooperative working area, thereby enhancing the security of the cooperative working information.

In one embodiment, the method further includes: receiving, by the first terminal device, a first exit command sent by a third terminal device, where the first terminal device is a secondary terminal device, and the third terminal device is a primary terminal device in the plurality of terminal devices; and deleting, by the first terminal device, the cooperative working information based on the first exit command.

When the first terminal device is a secondary device, the first terminal device may delete the cooperative working information and the configuration information of the network based on a received exit command (namely, the first exit command) sent by a primary device. In this way, when a mechanism for a secondary device to exit cooperative working fails, the secondary device may be forced to exit cooperative working based on a command from the primary device, thereby enhancing the security of the cooperative working information.

In one embodiment, the method further includes: determining, by the first terminal device, that a fourth terminal device is about to leave a cooperative working area, where the cooperative working area is an area in which the plurality of terminal devices perform cooperative playing and/or cooperative recording, the fourth terminal device is a secondary terminal device in the plurality of terminal devices, and the first terminal device is a primary terminal device in the plurality of terminal devices; and sending, by the first terminal device, a second exit command to the fourth terminal device based on that the fourth terminal device is about to leave the cooperative working area, where the second exit command is used to instruct the fourth terminal device to delete the cooperative working information.

When the first terminal device is a primary device, the first terminal device may send the second exit command to a secondary device based on that the secondary device is about to leave the cooperative working area. In this way, when a mechanism for a secondary device to exit cooperative working fails, the secondary device may be forced to exit cooperative working based on a command from the primary device, thereby enhancing the security of the cooperative working information.

In one embodiment, the method further includes: obtaining, by the first terminal device, a third exit command, where the third exit command is used to instruct a fifth terminal device to exit the network, the fifth terminal device is a secondary terminal device in the plurality of terminal devices, and the first terminal device is a primary terminal device in the plurality of terminal devices; and sending, by the first terminal device, a fourth exit command to the fifth terminal device based on the third exit command, where the fourth exit command is used to instruct the fifth terminal device to delete the cooperative working information.

The third exit command is, for example, a command input by a user of a primary device. When the user of the primary device finds that a secondary device is leaving the cooperative working area, the user of the primary device may input the third exit command to the primary device, where the third exit command is used to instruct the secondary device to exit the network. After receiving the third exit command, the primary device sends the fourth exit command to the secondary device based on the third exit command, so as to instruct the secondary device to: exit the network, and delete the cooperative working information and the configuration information of the network.

In one embodiment, the method further includes: receiving, by the first terminal device, incoming call indication information; and deleting, by the first terminal device, the cooperative working information based on the incoming call indication information.

The incoming call indication information is used to indicate that an incoming call is about to be connected currently. To ensure the security of the cooperative working information, communication between the first terminal device and the network needs to be disconnected, and the cooperative working information stored by the first terminal device needs to be deleted.

In one embodiment, the method further includes: receiving, by the first terminal device through the network, an access request sent by a sixth terminal device, where the access request is used to request to access information of the first terminal device other than the cooperative working information; and denying, by the first terminal device, the access request.

During cooperative working, the first terminal device may receive an access request sent by another terminal device, where the access request is used to request to access information stored by the first terminal device. For example, when the first terminal device is a primary device, the access request may be to read a particular memory segment of the primary device. If information stored in the memory segment includes information other than the cooperative working information, the first terminal device denies the access request, so as to protect privacy of a user of the first terminal device.

In one embodiment, the method further includes: receiving, by the first terminal device, an internet access request from a seventh terminal device, where the internet access request is used to request to obtain information other than the cooperative working information, and the seventh terminal device is one of the plurality of terminal devices; and denying, by the first terminal device, the internet access request.

The internet access request is, for example, a request to request, from a browser of a secondary device, to obtain Internet information through a hotspot of a primary device, where the Internet information does not belong to the cooperative working information. Then the first terminal device denies the request after receiving the request, so as to prevent the network from being stolen through the first terminal device.

In one embodiment, the method further includes: when the first terminal device is in a cooperative playing state and/or a cooperative recording state, prohibiting a process other than the cooperative working process from invoking a recorder of the first terminal device.

When the first terminal device is in a cooperative playing state, the first terminal device may play cooperative working-related audio. When the first terminal device is in a cooperative recording state, the first terminal device may record cooperative working-related audio. Therefore, when the first terminal device is in a cooperative playing state and/or a cooperative recording state, a process other than the cooperative working process is prohibited from invoking a recorder of the first terminal device, so as to enhance the security of the cooperative working information.

In one embodiment, the method further includes: obtaining, by the first terminal device, first indication information, where the first indication information is used to indicate that the network is about to be disconnected; and playing, by the first terminal device, a voice prompt based on the first indication information, where the voice prompt is used to prompt a user to upload the cooperative working information to a server, and the cooperative working information is information recorded by the first terminal device.

This embodiment can reduce a risk of a loss caused by forgetting to upload the cooperative working information.

In one embodiment, the method further includes: when the network is disconnected, deleting, by the first terminal device, the folder in which the cooperative working information is stored.

When the network is disconnected, the first terminal device immediately deletes the folder in which the cooperative working information is stored and the configuration information of the network, regardless of whether the cooperative working information has been deleted after being played or whether the cooperative working information has been uploaded after being recorded, so as to reduce a risk of disclosure of the cooperative working information.

In one embodiment, the method further includes: deleting, by the first terminal device, configuration information of the network.

According to a second aspect, an apparatus for secure multi-terminal cooperative working is provided. The apparatus may implement functions performed by the first terminal device in the method according to the first aspect. The functions may be implemented by hardware, or may be implemented by hardware executing corresponding software. The hardware or software includes one or more units or modules corresponding to the foregoing functions.

In one embodiment, the apparatus includes a processor and a transceiver. The processor is configured to provide support for the apparatus to perform a corresponding function in the method according to the first aspect. The transceiver is configured to support the apparatus to communicate with another network element. The apparatus may further include a memory, where the memory is configured to be coupled with the processor and store a program instruction and data that are necessary for the apparatus.

According to a third aspect, a computer readable storage medium is provided. The computer readable storage medium stores computer program code. When the computer program code is executed by a processing unit or a processor, a first terminal device is enabled to perform the method according to the first aspect.

According to a fourth aspect, a chip is provided, storing an instruction. When run on a first terminal device, the instruction enables the chip to perform the method according to the first aspect.

According to a fifth aspect, a computer program product is provided. The computer program product includes computer program code. When run by an obtaining unit of a first terminal device and a processing unit of the first terminal device, the computer program code enables the first terminal device to perform the method according to the first aspect.

DESCRIPTION OF EMBODIMENTS

The following describes technical solutions of this application with reference to the accompanying drawings.

Figure 1:
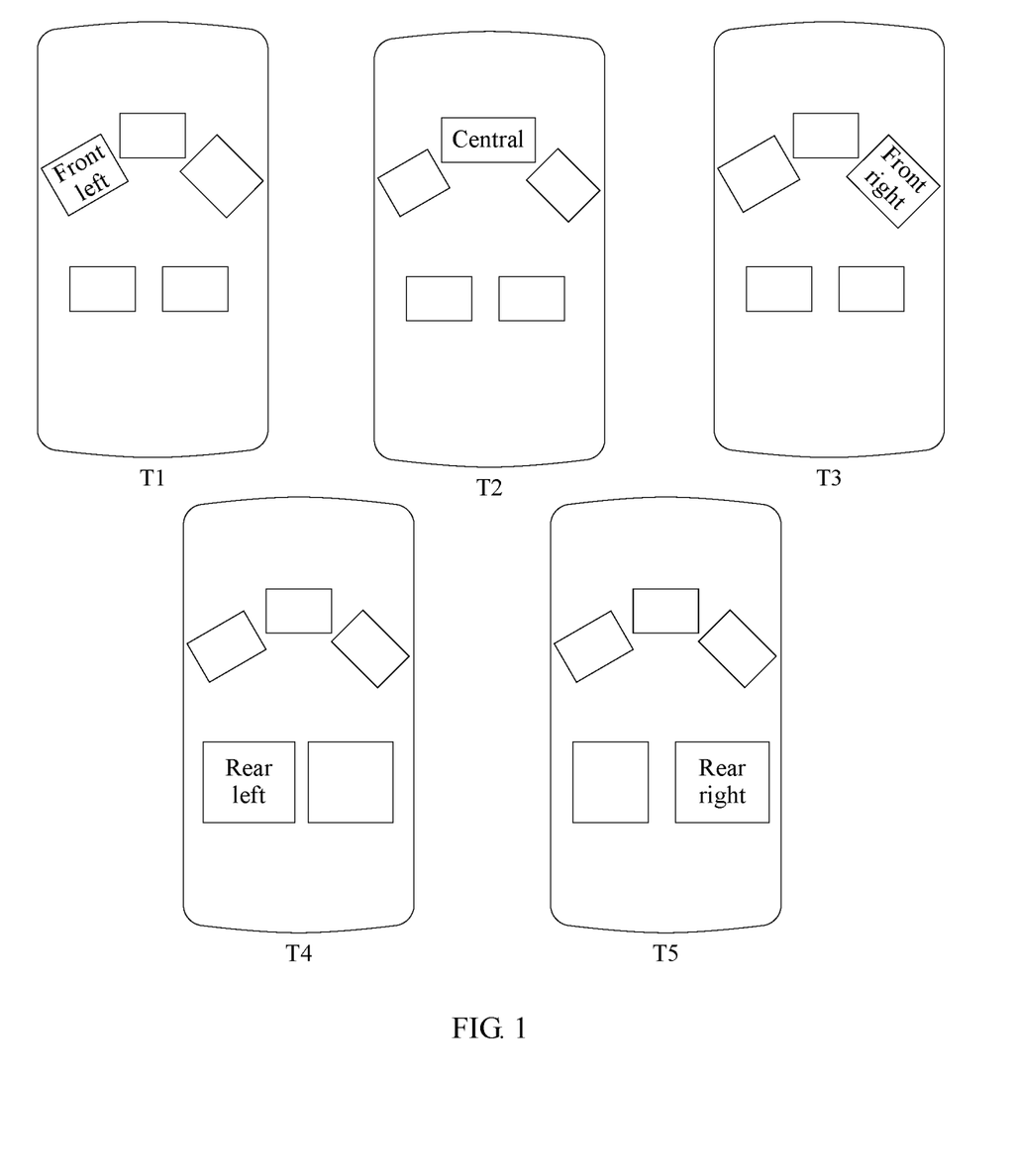
FIG. 1 is a schematic diagram of a cooperative network to which this application is applicable.

FIG. 1 is a schematic diagram of a cooperative network to which this application is applicable.

As shown in FIG. 1, five mobile phones form a cooperative network. The cooperative network may be formed by using one of the five mobile phones as a hotspot, or the cooperative network may be formed by using a router. T1 may be set as a primary (master) device, and the rest mobile phones may be set as secondary (slave) devices. Alternatively, one mobile phone (for example, T2) from T2 to T5 may be chosen as a backup primary device. When T1 becomes faulty, T2 serves as a primary device to maintain normal working of the cooperative network. Functions of the primary device include but are not limited to: sending a broadcast message to perform cooperative networking; sending a synchronous time check message to perform synchronization; and sending a sound pickup instruction or a sound playing instruction. Functions of the secondary device include but are not limited to: receiving the broadcast message and joining the cooperative network; replying to the synchronous time check message to perform synchronization; receiving the sound pickup instruction or the sound playing instruction; and cooperatively completing sound pickup or sound playing based on the sound pickup instruction or the sound playing instruction.

The five mobile phones shown in FIG. 1 may cooperatively play different sound channels of same audio. For example, T1 plays a front left sound channel ("front left" for short), T2 plays a central sound channel ("central" for short), T3 plays a front right sound channel ("front right" for short), T4 plays a rear left sound channel ("rear left" for short), and T5 plays a rear right sound channel ("rear right" for short), thereby implementing an effect of a plurality of surrounding sound channels.

The foregoing example is merely example description. Alternatively, the five mobile phones may cooperatively play a voice source of a same sound channel, or cooperatively perform sound recording, or cooperatively perform a video conference, or cooperatively perform another task. In addition, a quantity of terminal devices that perform cooperative working is not limited to the quantity shown in FIG. 1, and terminal devices that perform cooperative working are not limited to the mobile phones shown in FIG. 1 and may alternatively be another type of terminal devices, for example, a tablet computer.

Figure 2:
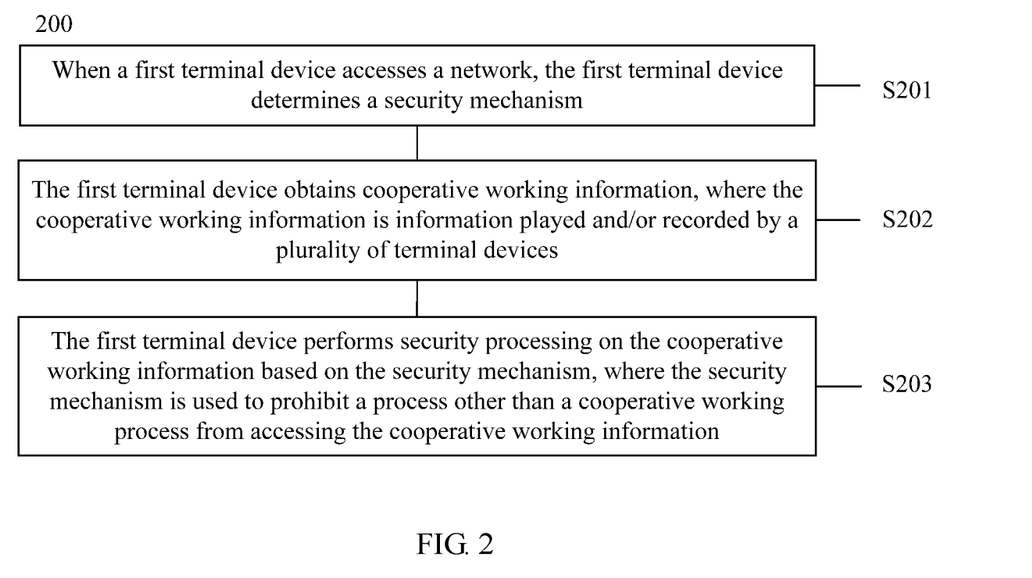
FIG. 2 is a schematic diagram of a method for secure multi-terminal cooperative working according to this application.

FIG. 2 shows a method for secure multi-terminal cooperative working according to this application. The method 200 is applied to a network on which a plurality of terminal devices perform cooperative playing and/or cooperative recording. The plurality of terminal devices include a first terminal device. The method 200 includes the following operations:

S201. When the first terminal device accesses the network, the first terminal device determines a preset security mechanism.

S202. The first terminal device obtains cooperative working information, where the cooperative working information is information played and/or recorded by the plurality of terminal devices.

S203. The first terminal device performs security processing on the cooperative working information based on the security mechanism, where the security mechanism is used to prohibit a process other than a cooperative working process from accessing the cooperative working information.

In this application, unless otherwise stated, the first terminal device may be a primary device, or may be a secondary device.

When the first terminal device is a primary device, the first terminal device may send a broadcast message. The broadcast message is used to construct a cooperative network. When the first terminal device receives at least one acknowledgment (ACK) message for the broadcast message, it can be determined that the first terminal device has accessed the network. Alternatively, the first terminal device may construct a network with another terminal device by using a near field communication (NFC) technology or a two-dimensional code technology.

When the first terminal device is a secondary device, the first terminal device may access the network by receiving a broadcast message sent by a primary device. The broadcast message carries a configuration parameter of the network. After accessing the network, the first terminal device may send an ACK to a primary device, to notify the primary device that the first terminal device has accessed the network. Alternatively, the first terminal device may construct a network with the primary device by using the NFC technology or the two-dimensional code technology.

There may be a plurality of primary devices on the network. For example, a plurality of terminal devices are respectively located in different rooms, and then one primary device may be disposed in each room. A primary device that creates the network is a primary device whose permission is the highest, and can decide an identity (a secondary device or a lower-permission primary device) of another terminal device. Each primary device may further have a backup primary device. To be specific, when a primary device becomes faulty, a backup primary device serves as the primary device to maintain normal working of the network.

The network in this application is a network used for cooperative working ("cooperative network" for short). For example, when the plurality of terminal devices are connected through a router to perform cooperative working, a wireless fidelity (WiFi) network is the cooperative network. When the plurality of terminal devices perform cooperative working through a cellular network of a 4th generation mobile communication (4G) system, a long term evolution (LTE) network is the cooperative network. Alternatively, the cooperative network may be a set of different types of networks. For example, some terminal devices in the plurality of terminal devices perform cooperative working through a WiFi network, and some terminal devices perform cooperative working through an LTE network. In this case, the cooperative network is the WiFi network and the LTE network. The foregoing examples are merely example description, and a specific form of the cooperative network is not limited in this application.

When determining that the first terminal device has accessed the network, the terminal device may determine a security mechanism, where the security mechanism is a manner of performing security processing on the cooperative working information by the first terminal device.

In S202, the first terminal device may receive cooperative working information from a cloud, or may receive cooperative working information from a plurality of terminal devices except the first terminal device (referred to as "other terminal devices" for short in the following), or may record cooperative working information on its own. The cooperative working information may be one or more of text information, audio information, picture information, and video information, or may be another type of information. Content of the cooperative working information is not limited in this application.

After obtaining the cooperative working information, the first terminal device performs security processing on the cooperative working information based on the security mechanism, so that a process other than the cooperative working process cannot access the cooperative working information, thereby ensuring security of the cooperative working information. The cooperative working process is, for example, a process generated during running of cooperative working software installed in the first terminal device.

In one embodiment, the performing, by the first terminal device, security processing on the cooperative working information based on the security mechanism includes the following operation:

The first terminal device stores the cooperative working information into a secure folder, where the secure folder is a folder that cannot be read by a process other than the cooperative working process, and the security mechanism is a manner of storing the cooperative working information.

The secure folder is, for example, a folder on which specific permission has been set. The specific permission means that only the cooperative working process is permitted to access the folder, and access to the folder by another process is denied. The secure folder is, for example, a private folder, or a hidden folder, or an encrypted folder.

In one embodiment, a secure folder with a random path is generated during generation of the secure folder, so as to further enhance the security of the cooperative working information.

In one embodiment, the method 200 further includes the following operation:

The first terminal device prohibits a process other than the cooperative working process from forwarding the cooperative working information.

Even if the cooperative working information is read by a process other than the cooperative working process, the first terminal device may further prevent disclosure of the cooperative working information by prohibiting a process other than the cooperative working process from forwarding the cooperative working information. For example, a process other than the cooperative working process may be prohibited from invoking a communications module of the first terminal device, thereby further enhancing the security of the cooperative working information.

In one embodiment, the performing, by the first terminal device, security processing on the cooperative working information based on the security mechanism includes the following operations:

The first terminal device sends or broadcasts a first frame in the cooperative working information through the cooperative working process.

The first terminal device deletes the first frame from the cooperative working information.

The first terminal device sends or broadcasts a second frame in the cooperative working information through the cooperative working process.

The first terminal device deletes the second frame from the cooperative working information.

The first terminal device may send the cooperative working information in a frame-by-frame sending manner, and delete a frame each time the frame has been sent; and the first terminal device may also play the cooperative working information in a frame-by-frame playing manner, and delete a frame each time the frame has been played. In this way, the first terminal device does not need to wait till the entire cooperative working information has been sent or played, to delete the cooperative working information, thereby reducing a time in which the cooperative working information is stored in the first terminal device and further reducing such a risk that the cooperative working information is forwarded.

In one embodiment, the method 200 further includes the following operations:

The first terminal device detects signal strength of the network.

When the signal strength of the network is less than or equal to a preset strength threshold, the first terminal device deletes the cooperative working information.

A user of the first terminal device may leave a cooperative working area while carrying the first terminal device. Therefore, the first terminal device needs to detect the signal strength of the network in a cooperative working process, so as to determine whether the first terminal device has left the cooperative working area. When the signal strength of the network is less than or equal to the preset strength threshold, it indicates that the first terminal device has already left the cooperative working area, and then the first terminal device deletes the stored cooperative working information based on the foregoing condition. In one embodiment, the first terminal device may further delete configuration information (for example, a WiFi password or a conference access password) of the network.

A value of the strength threshold may be set based on a scope of the cooperative working area. When the cooperative working area is relatively small, the strength threshold is set to a relatively large value. For example, the strength threshold may be set to −60 decibels relative to one milliwatt (dBm). When signal strength detected by the first terminal device is less than −60 dBm, the first terminal device determines that the first terminal device has already left the cooperative working area and needs to delete the cooperative working information and the configuration information of the network. When the cooperative working area is relatively large, the strength threshold may be set to a relatively small value, so as to prevent a terminal device located at an edge of the cooperative working area from being kicked out of the network due to a relatively weak signal. For example, the strength threshold may be set to −90 decibels relative to one milliwatt (dBm). When signal strength detected by the first terminal device is less than −90 dBm, the first terminal device determines that the first terminal device has already left the cooperative working area and needs to delete the cooperative working information and the configuration information of the network.

The foregoing examples are merely example description. Alternatively, the strength threshold may be set to a value in units of decibel watts (dBw).

Even if a communication fault occurs on the network currently and as a result a secondary device cannot decode information sent by another terminal device (for example, an exit command sent by a primary device), the foregoing embodiment can prevent the secondary device from leaving a cooperative working area while carrying the cooperative working information. In addition, the foregoing embodiment can further prevent the primary device from leaving the cooperative working area while carrying the cooperative working information, thereby enhancing the security of the cooperative working information.

In this application, a manner of detecting a network signal by the first terminal device is not limited. For example, the first terminal device may determine strength of a network signal based on received signal strength indication (RSSI) information. When a value of the RSSI is less than or equal to a preset strength threshold, the first terminal device determines that the first terminal device has already left the cooperative working area and then the first terminal device deletes the cooperative working information and the configuration information of the network. For another example, the first terminal device may alternatively determine strength of a network signal based on a signal-to-noise ratio (SNR). When a value of the SNR is less than or equal to a preset strength threshold, the first terminal device determines that the first terminal device has already left the cooperative working area and then the first terminal device deletes the cooperative working information and the configuration information of the network. For still another example, the first terminal device may alternatively determine strength of a network signal based on a packet loss rate. When a value of the packet loss rate is less than or equal to a preset packet loss rate threshold, the first terminal device determines that the first terminal device has already left the cooperative working area and then the first terminal device deletes the cooperative working information and the configuration information of the network.

In one embodiment, the method 200 further includes the following operations:

The first terminal device detects a distance between the first terminal device and a second terminal device, where the first terminal device is a secondary terminal device (namely, a secondary device), and the second terminal device is a primary terminal device in the plurality of terminal devices.

When the distance between the first terminal device and the second terminal device is greater than a preset distance threshold, the first terminal device deletes the cooperative working information and configuration information of the network.

A secondary device may detect a distance between the secondary device and a primary device. When the distance between the secondary device and the primary device is relatively long, the secondary device deletes the cooperative working information and configuration information of the network immediately after determining that the secondary device has left the cooperative working area, thereby enhancing the security of the cooperative working information.

A method for the detecting a distance between the first terminal device and a second terminal device may be the method described above. For example, when strength of a signal that is received by the first terminal device and that is sent by the second terminal device is less than a preset threshold, it may be determined that the distance between the first terminal device and the second terminal device is greater than the preset distance threshold, and then the first terminal device may delete the cooperative working information and the configuration information of the network.

The foregoing example is merely example description. Alternatively, the first terminal device may detect the distance between the first terminal device and the second terminal device in another manner. For example, the first terminal device may determine the distance between the first terminal device and the second terminal device based on a quantity of steps counted by a step counting module of the first terminal device; and after cooperative working starts, when the quantity of steps counted by the step counting module of the first terminal device exceeds a preset step quantity threshold, the first terminal device may determine that the first terminal device has already left the cooperative working area. To prevent misjudgment, a period of time (for example, 60 seconds) may be further set on the first terminal device. If a quantity of steps counted by the step counting module of the first terminal device in this period of time exceeds a preset step quantity threshold (for example, 20 steps), the first terminal device may determine that the first terminal device has already left the cooperative working area.

Alternatively, the first terminal device may determine, based on a 2-tuple with signal strength and a distance, whether the cooperative working information needs to be deleted. For example, a signal strength threshold is set to −90 dBm and a step quantity threshold is set to 20 steps; and when a quantity of steps counted by the first terminal device exceeds 20 steps, if the detected signal strength is greater than −90 dBm, it indicates that the first terminal device probably has changed its location in the cooperative working area but does not leave the cooperative working area, and therefore the first terminal device does not delete the cooperative working information but continues to perform cooperative playing and/or cooperative recording; or when a quantity of steps counted by the first terminal device exceeds 20 steps, if the detected signal strength is less than −90 dBm, it indicates that the first terminal device has already left the cooperative working area, and therefore the first terminal device deletes the cooperative working information. This can avoid misjudgment caused by determining, based on a single factor (signal strength or a distance), whether the first terminal device has already left the cooperative working area.

In one embodiment, the method 200 further includes the following operations:

The first terminal device receives a first exit command sent by a third terminal device, where the first terminal device is a secondary terminal device, and the third terminal device is a primary terminal device in the plurality of terminal devices.

The first terminal device deletes the cooperative working information and the configuration information of the network based on the first exit command.

When the first terminal device is a secondary device, the first terminal device may delete the cooperative working information and the configuration information of the network based on a received exit command (namely, the first exit command) sent by a primary device. In this way, when a mechanism for a secondary device to exit cooperative working fails, the secondary device may be forced to exit cooperative working based on a command from the primary device, thereby enhancing the security of the cooperative working information.

In one embodiment, the method 200 further includes the following operations:

The first terminal device determines that a fourth terminal device is about to leave a cooperative working area, where the cooperative working area is an area in which the plurality of terminal devices perform cooperative playing and/or cooperative recording, the fourth terminal device is a secondary terminal device in the plurality of terminal devices, and the first terminal device is a primary terminal device in the plurality of terminal devices.

The first terminal device sends a second exit command to the fourth terminal device based on that the fourth terminal device is about to leave the cooperative working area, where the second exit command is used to instruct the fourth terminal device to delete the cooperative working information.

In this application, the cooperative working area is an area in which the plurality of terminal devices perform cooperative playing and/or cooperative recording, for example, a conference room, a recording room, or a studio. The plurality of terminal devices may be located in a same cooperative working area, or may be located in a plurality of cooperative working areas. For example, when terminal devices respectively located in conference rooms in two cities are performing cooperative working, the conference rooms in the two cities are two cooperative working areas.

When the first terminal device is a primary device, the first terminal device may send the second exit command to a secondary device based on that the secondary device is about to leave the cooperative working area. In this way, when a mechanism for a secondary device to exit cooperative working fails, the secondary device may be forced to exit cooperative working based on a command from the primary device, thereby enhancing the security of the cooperative working information.

For example, when a secondary device is affected by a virus, a network signal strength measuring function and a distance measuring function of the secondary device may fail. In this case, if a primary device detects that signal strength of the secondary device is less than a preset strength threshold, the primary device may send the second exit command to the secondary device, to instruct the secondary device to: exit the cooperative network, and delete the cooperative working information and the configuration information of the network.

In one embodiment, the method 200 further includes the following operations:

The first terminal device receives a third exit command, where the third exit command is used to instruct a fifth terminal device to exit the network, the fifth terminal device is a secondary terminal device in the plurality of terminal devices, and the first terminal device is a primary terminal device in the plurality of terminal devices.

The first terminal device sends a fourth exit command to the fifth terminal device based on the third exit command, where the fourth exit command is used to instruct the fifth terminal device to delete the cooperative working information.

The third exit command is, for example, a command input by a user of a primary device. When the user of the primary device finds that a secondary device is leaving the cooperative working area, the user of the primary device may input the third exit command to the primary device, where the third exit command is used to instruct the secondary device to exit the network. After receiving the third exit command, the primary device sends the fourth exit command to the secondary device based on the third exit command, so as to instruct the secondary device to: exit the network, and delete the cooperative working information and the configuration information of the network.

In one embodiment, the method 200 further includes the following operations:

The first terminal device receives incoming call indication information.

The first terminal device deletes the cooperative working information and the configuration information of the network based on the incoming call indication information.

The incoming call indication information is used to indicate that an incoming call is about to be connected currently. To ensure the security of the cooperative working information, communication between the first terminal device and the network needs to be disconnected, and the cooperative working information stored by the first terminal device needs to be deleted.

The incoming call indication information is, for example, a paging message sent by a base station, or may be a radio resource control (RRC) connection setup message sent by a base station, or may be another piece of air interface signaling received by the first terminal device when the first terminal device is called. In this application, a specific form of the incoming call indication information is not limited.

In one embodiment, the method 200 further includes the following operations:

The first terminal device receives, through the network, an access request sent by a sixth terminal device, where the access request is used to request to access information of the first terminal device other than the cooperative working information.

The first terminal device denies the access request.

During cooperative working, the first terminal device may receive an access request sent by another terminal device, where the access request is used to request to access information stored by the first terminal device. For example, when the first terminal device is a primary device, the access request may be to read a particular memory segment of the primary device. If information stored in the memory segment includes information other than the cooperative working information, the first terminal device denies the access request, so as to protect privacy of a user of the first terminal device.

A manner of the denying the access request may be: sending access denial or access failure information to the sixth terminal device; or may be: making no response.

In one embodiment, the method 200 further includes the following operations:

The first terminal device receives an internet access request from a seventh terminal device, where the internet access request is used to request to obtain information other than the cooperative working information, and the seventh terminal device is one of the plurality of terminal devices.

The first terminal device denies the internet access request.

The internet access request is, for example, a request to request, from a browser of a secondary device, to obtain Internet information through a hotspot of a primary device, where the Internet information does not belong to the cooperative working information. Then the first terminal device denies the request after receiving the request, so as to prevent the network from being stolen through the first terminal device.

In one embodiment, the method 200 further includes the following operations:

When the first terminal device is in a cooperative playing state and/or a cooperative recording state, a process other than the cooperative working process is prohibited from invoking a recorder of the first terminal device.

When the first terminal device is in a cooperative playing state, the first terminal device may play cooperative working-related audio. When the first terminal device is in a cooperative recording state, the first terminal device may record cooperative working-related audio. Therefore, when the first terminal device is in a cooperative playing state and/or a cooperative recording state, a process other than the cooperative working process is prohibited from invoking a recorder of the first terminal device, so as to enhance the security of the cooperative working information.

In one embodiment, the method 200 further includes the following operations:

The first terminal device obtains first indication information, where the first indication information is used to indicate that the network is about to be disconnected.

The first terminal device plays a voice prompt based on the first indication information, where the voice prompt is used to prompt a user to upload the cooperative working information to a server, and the cooperative working information is information recorded by the first terminal device.

For example, when the first terminal device is a primary device, a user of the primary device presses an End key and then the first terminal device is triggered to generate first indication information; and the first terminal device may play a voice prompt based on the first indication information, to prompt the first terminal device to upload recorded cooperative working information.

For another example, when the first terminal device is a secondary device and the first terminal device receives first indication information sent by a primary device, the first terminal device plays a voice prompt based on the first indication information, to prompt the first terminal device to upload recorded cooperative working information.

The foregoing embodiment can reduce a risk of a loss caused by forgetting to upload the cooperative working information.

In one embodiment, the method 200 further includes the following operation:

When the network is disconnected, the first terminal device deletes the configuration information of the network and the folder in which the cooperative working information is stored.

When the network is disconnected, the first terminal device immediately deletes the folder in which the cooperative working information is stored and the configuration information of the network, regardless of whether the cooperative working information has been deleted after being played or whether the cooperative working information has been uploaded after being recorded, so as to reduce a risk of disclosure of the cooperative working information.

The foregoing describes in detail an example of the method for secure multi-terminal cooperative working provided in this application. It may be understood that, to implement the foregoing functions, the first terminal device includes a corresponding hardware structure and/or software module for executing the functions. A person skilled in the art should be easily aware that, with reference to example units and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional units of the first terminal device may be divided according to the foregoing method example. For example, the functional units may be divided based on the functions, or two or more functions may be integrated into a processing unit. The integrated unit may be implemented in a form of hardware, or may be implemented in a form of a software functional unit. It should be noted that, in this application, the unit division is an example and merely logical function division, and there may be another division manner in actual implementation.

Figure 3:
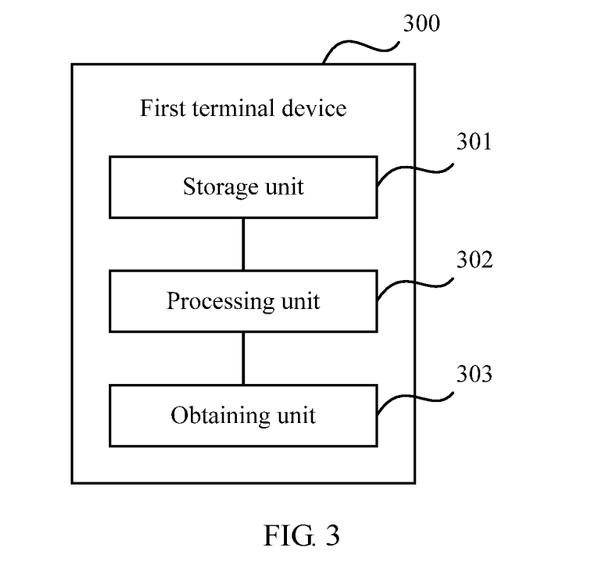
FIG. 3 is a possible schematic diagram of a first terminal device according to this application.

FIG. 3 is a possible schematic structural diagram of the first terminal device in the foregoing embodiment when the integrated unit is used. The first terminal device 300 includes a processing unit 302 and an obtaining unit 303. The processing unit 302 is configured to control and manage an action of the first terminal device 300. For example, the processing unit 302 is configured to provide support for the first terminal device 300 to perform the steps in FIG. 2 and/or other processes of the technologies described in this specification. The obtaining unit 303 is configured to provide support for the first terminal device 300 to communicate with another communications device, for example, obtain cooperative working information sent by another device. The first terminal device 300 may further include a storage unit 301, configured to store program code and data of the first terminal device 300.

For example, when the first terminal device accesses the network, the processing unit 302 is configured to determine a security mechanism preset in the first terminal device; the obtaining unit 303 is configured to obtain cooperative working information, where the cooperative working information is information played and/or recorded by a plurality of terminal devices; and the processing unit 302 is further configured to perform security processing on the cooperative working information based on the security mechanism, where the security mechanism is used to prohibit a process other than a cooperative working process from accessing the cooperative working information.

The processing unit 302 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor/controller can implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The obtaining unit 303 may be, for example, one or more of a transceiver, a transceiver circuit, a communications interface, and a recorder. For example, when the first terminal device receives the cooperative working information from another terminal device, the obtaining unit 303 may be a transceiver. When the information obtained by the first terminal device is information input by a user, the obtaining unit may be a touchscreen. When the information obtained by the first terminal device is recorded information, the obtaining unit 303 may be a recorder. Alternatively, the obtaining unit 303 may be another module or unit capable of obtaining information. The storage unit 301 may be a memory.

Figure 4:
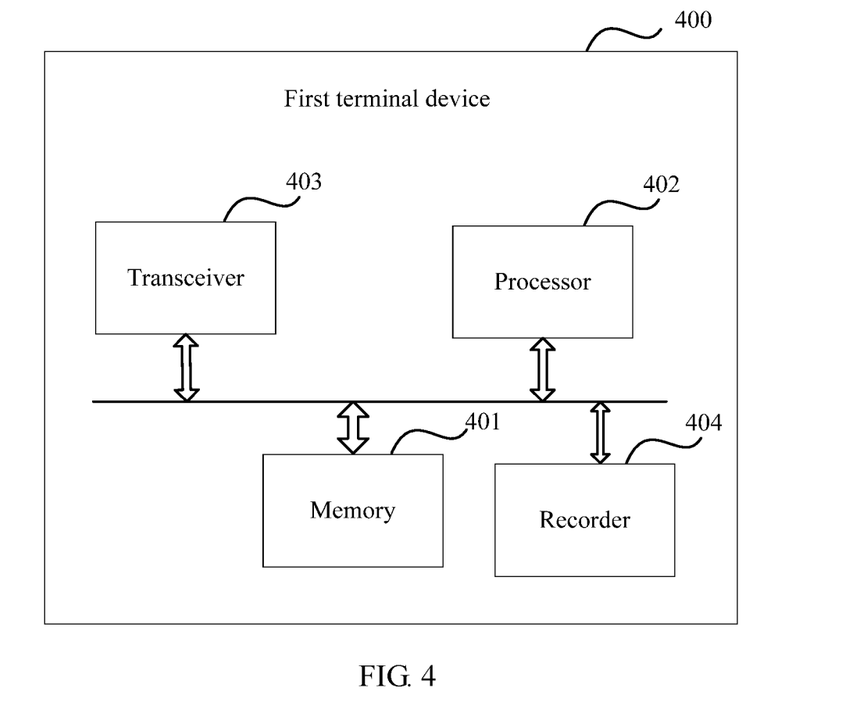
FIG. 4 is another possible schematic diagram of a first terminal device according to this application.

When the processing unit 302 is a processor, the obtaining unit 303 is a transceiver and a recorder, and the storage unit 301 is a memory, the first terminal device in this application may be a first terminal device shown in FIG. 4.

As shown in FIG. 4, the first terminal device 400 includes a processor 402, a transceiver 403, a recorder 404, and a memory 401. The transceiver 403, the processor 402, the recorder 404, and the memory 401 may communicate with each other through an internal connection path, to transfer a control signal and/or data signal.

It may be clearly understood by a person skilled in the art that, for a detailed working process of the foregoing apparatus and units, reference may be made to a corresponding process in the foregoing method embodiment, so as to facilitate and simplify description. Details are not described herein again.

After obtaining the cooperative working information, the first terminal device 300 or the first terminal device 400 provided in this application performs security processing on the cooperative working information based on the security mechanism, so that a process other than the cooperative working process cannot access the cooperative working information, thereby ensuring security of the cooperative working information.

The foregoing structures of the first terminal device are merely examples for describing a structure required to perform the method for secure cooperative working provided in this application. Components actually included in the first terminal device are not limited to the components shown in FIG. 4.

It should be understood that the transceiver may include a transmitter and a receiver. The transceiver may further include an antenna, and there may be one or more antennas. The memory may be a separate component, or may be integrated into the processor. All or some of the foregoing components may be integrated into a chip during implementation, for example, integrated into a baseband chip during implementation.

The first terminal device in the apparatus embodiments corresponds to the first terminal device in the method embodiment, and a corresponding module performs a corresponding step. For example, a sending module or a transmitter performs a sending step in the method embodiment, a receiving module or a receiver performs a receiving step in the method embodiment, and other steps than sending and receiving steps may be performed by a processing module or a processor. For a function of a specific module, refer to the corresponding method embodiment. Details are not described again.

The following are other examples provided in this application.

A corresponding embodiment is designed in a networking phase, in a cooperative-network running process, and in a network exit phase. In the embodiments of the present invention, a confidentiality mechanism exists independently in each related scenario, and a user may select a part of the confidentiality mechanism or the entire confidentiality mechanism.

An assurance mechanism included in this application includes the following key points:

After a cooperative network is established, a temporary recording file and a playing file are temporarily locked (the files are encrypted, or a directory number is randomized), and cannot be forwarded, or cannot be parsed even if the files are successfully forwarded.

During cooperative record playing, WiFi strength is tested after a user leaves; if the WiFi strength is lower than a threshold, a password of the user and a temporary file are destroyed, and then the network is disconnected; and when the user comes back, the user can join the network again.

Before running of the cooperative network ends, a WiFi password and a temporary file are cleared.

During running of the cooperative network, a primary device can access only a particular memory segment of a secondary device, or can send only a request message to a secondary device, to access a particular memory segment of the secondary device (for example, in Android, only a drive module AudioFlinger and a microphone or speaker can be invoked).

The assurance mechanism included in this application further includes the following key points:

after the primary device is set, it is ensured, through onsite NFC or code scanning, that only phones of conference participants access a conference;

in a process such as a cooperative playing or sound recording process, a recorder built in a phone or another process or a third-party APP that requires a response from a microphone is locked;

in the cooperative network, when a secondary device has finished local sound pickup in a frame-by-frame manner, or after a secondary device has sent data frames to the primary device when signal strength of the secondary device is enhanced, a current memory segment is cleared;

in the cooperative network, the primary device receives, in a frame-by-frame manner, data frames sent by each secondary device, and writes the data frames into a private file in a private folder, where another application or process cannot access the folder; and a path of the private folder can be generated at any time, and cannot be easily accessed by a user; or the primary device cannot access the private folder;

in the cooperative network, a secondary device receives, in a frame-by-frame manner, data frames sent by the primary device, and writes the data frames into a private file in a private folder, where another application or process cannot access the folder; and a path of the private folder can be generated at any time, and cannot be easily accessed by a user; or the primary device cannot access the private folder;

in a conference scenario, before a conference ends, a voice prompt is given to prompt a user to upload a voice memo to a cloud server; and after a cooperative application ends, all information about a current connection of the primary device and the secondary device, including a WiFi password and a private folder in which a recording file or a playing file is stored, is thoroughly cleared; and a current user needs to repeat a complete process of joining a cooperative network even if the current user wants to start a new process.

Figure 5:
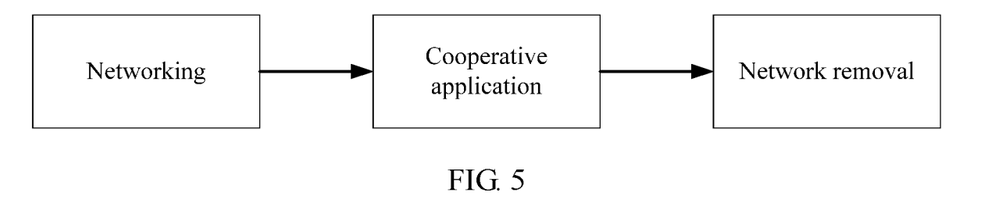
FIG. 5 is a schematic diagram of a security assurance mechanism according to this application.

FIG. 5 is a schematic diagram of a security assurance mechanism according to this application.

In the embodiments of the present invention, a corresponding confidentiality mechanism is designed from three phases, to reduce disclosure of key information and confidential information in a cooperative operation process. A cooperative operation includes but is not limited to: cooperative playing, cooperative sound pickup, a cooperative conference, or the like.

Phase 1: Networking

Figure 6:
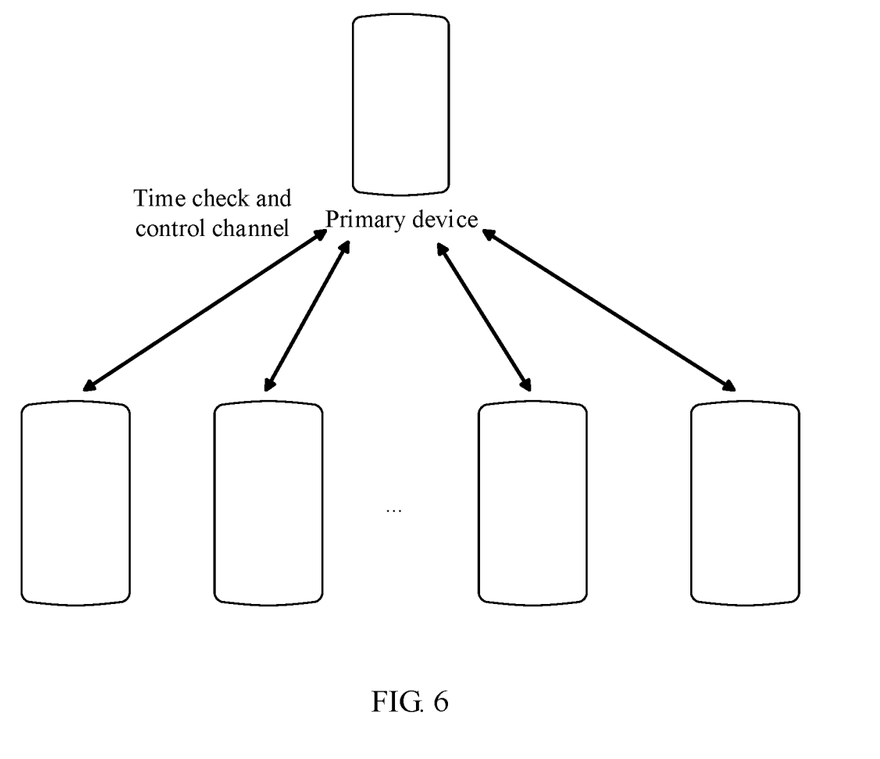
FIG. 6 shows a mode of networking of a plurality of terminal devices according to this application.
Figure 7:
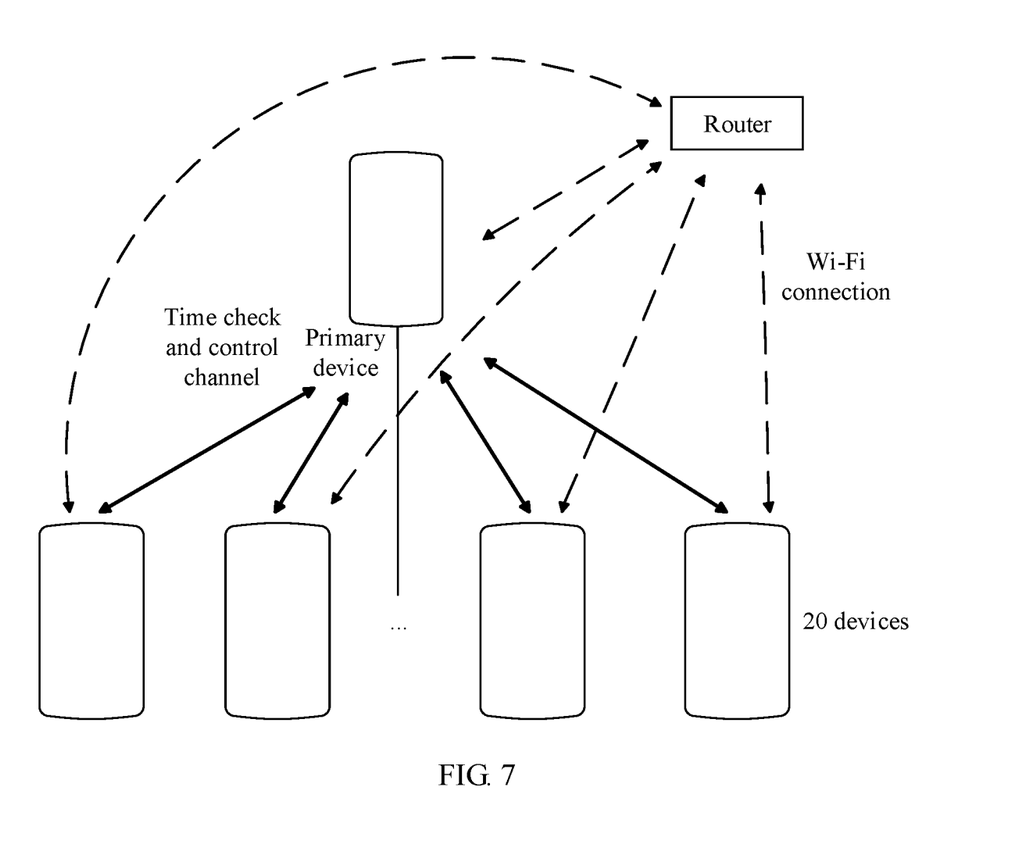
FIG. 7 shows another mode of networking of a plurality of terminal devices according to this application.

FIG. 6 and FIG. 7 show two typical networking modes.

A networking mode in FIG. 6 is that an AP hotspot is set in a primary device, for a secondary device to access; and a networking mode in FIG. 7 is that both a primary device and a secondary device access a router. The networking mode in FIG. 6 is suitable for application with a small quantity of terminals, and the networking mode in FIG. 7 is suitable for application with a large quantity of terminals. The foregoing network modes may be expanded by using a K tree and a packet network. Details are not described herein. A cooperative application includes but is not limited to: cooperative playing, cooperative sound recording, a cooperative conference, or the like.

Embodiments of the present invention is divided into two scenarios based on user locations.

All users are in a same area, for example, in an office. Then a user may select the foregoing networking mode based on a quantity of access terminals. A general process includes:

the primary device creates or accesses a cooperative network, where a password used for current access is set on the cooperative network; and a secondary device may join the encrypted network by using "Touch to connect" or "Shake once" of NFC or scanning a two-dimensional code on a screen of the primary device.

Another software implementation method is that all cooperative devices use a same software platform, for example, a music player or recording pen software. During network setup, the primary device adds other users beside the primary device to one cooperative group in a manner of adding friends. Sound channel configuration is completed in an adding process. For example, there are five sound channels. According to an adding sequence, by default the primary device and a newly-joined secondary device each play a sound channel, or a sound pickup channel, or the like in a Left-Right-Central-Rear left-Rear right order.

As all users are in the same area and visible during access, another unauthorized user's access is prevented. This scenario is suitable for cooperative music playing for a team, or the like.

All users are divided into groups, and each group is located in a different area, including a remote access area. A general process includes:

the primary device creates or accesses a cooperative network, where a password used for current access is set on the cooperative network;

the primary device transmits access information such as the password to a remote local primary device through the network; and a secondary device in each area may join the encrypted network by using "Touch to connect" or "Shake once" of NFC or scanning a two-dimensional code on a screen of a local primary device.

In each area except for an area in which the primary device is located, a local primary device and an auxiliary primary device are disposed. For a specific function, refer to the following description.

Phase 2: Cooperative Application Phase

In a cooperative application running process, relatively sensitive information includes the following:

Cooperative playing is used as an example. If the primary device downloads a stereo or multi-channel voice source through streaming from a cloud server and forwards a specific sound channel or all voice sources to another mobile phone through the cooperative network, there is a risk concerning intellectual property rights. From a subjective point of view, a user of the primary device does not expect that a copyright purchased by the user is simply duplicated by others.

Cooperative sound recording is used as an example. In a recording process, some participants transfer conference content to an external network by using another application; or copy recorded audio to an external network after the recording ends. A special scenario is about a conference recording pen function. In principle, sensitive content should be prevented from being disclosed randomly.

Therefore, for the foregoing sensitive information, embodiments of the present invention gives description based on at least two application scenarios: cooperative playing and cooperative sound recording. With regard to technologies, a related mechanism may be extended to a scenario such as a cooperative multi-party conference.

As described above, in a cooperative playing or cooperative sound recording process, users are divided by geographical locations into two or more groups, where each group includes a plurality of cooperative members, and the plurality of groups form a large cooperative network. Embodiments of the present invention also relates to this scenario in solution description.

Sound Playing

[Assuming that Members of the Cooperative Network are in a Same Physical Area, for Example, in a Same Room]

Cooperative playing is used as an example. In a cooperative playing process, the primary device forwards a stereo or multi-channel voice source, locally stored or downloaded from music cloud, to a secondary device. After the secondary device performs local playing in a frame-by-frame manner, a current memory segment is cleared. The processing mechanism may be frame-based processing, or processing upon completion of the playing.

Alternatively, the secondary device receives, in a frame-by-frame manner, data frames transferred by the primary device, and writes the data frames into a private file in a private folder, or into a hidden folder, or into an encrypted file. Another application or process cannot access the folder. A path of the private folder can be generated at any time, and cannot be easily accessed by a user.

In the cooperative playing process, a recorder built in a phone or another process or a third-party APP that requires a response from a microphone is locked.

If a player manner is used, on a main interface of a player, the primary device shares, to a group in a sharing manner, a file to be cooperatively played. When clicking is performed on a secondary device to confirm reception of the file, time synchronization between the primary device and the secondary device is completed. After the synchronization is completed, Play on the primary device is clicked. Then the primary device and the secondary device may simultaneously perform, based on the sound channels determined in the network access phase and a play start time after the synchronization, multi-device cooperative playing.

In the playing process, a user of the secondary device may synchronously perform an application, such as checking an email or browsing a web page. However, if the user needs to leave a current environment because of answering an incoming call or due to another reason, a distance detection process is started. Related information is periodically transferred between the primary device and the secondary device. A specific solution includes: mapping, through the network, a delay to a WiFi strength parameter or a distance parameter. When WiFi strength is weaker than a predefined threshold or the distance parameter is greater than a predefined threshold, a content clearing mechanism is started and specifically includes: accessing a private file in a private folder, or a hidden folder, or an encrypted file (including a case in which a path of the folder can be generated at any time), and deleting a voice source file already stored locally into the secondary device; and then deleting information such as a WiFi password left during the networking, and prompting the user of the secondary device that the user of the secondary device is to be cleared away from the cooperative network. If the user of the secondary device comes back to a room, the user of the secondary device may rejoin the cooperative network, with reference to the foregoing networking mode.

[Assuming that Members of the Cooperative Network are not in a Same Physical Area, for Example, in Two Different Remote Rooms]

When the cooperative members are distributed in different physical areas, for most security functions in cooperative playing, reference may be made to the foregoing method applicable when the members of the cooperative network are in a same physical area.

A major difference is as follows: When a secondary device leaves due to a reason, a local secondary device performs related verification and clearing operations. In a playing process, a user of the secondary device may synchronously perform an application, such as checking an email or browsing a web page. However, if the user needs to leave a current environment because of answering an incoming call or due to another reason, a distance detection process is started. Related information is periodically transferred between the local primary device and the secondary device. A specific solution includes: mapping, through the network, a delay to a WiFi strength parameter or a distance parameter. When WiFi strength is weaker than a predefined threshold or the distance parameter is greater than a predefined threshold, a content clearing mechanism is started and specifically includes: accessing a private file in a private folder, or a hidden folder, or an encrypted file (including a case in which a path of the folder can be generated at any time), and deleting a voice source file already stored locally into the secondary device; and then deleting information such as a WiFi password left during the networking, and prompting the user of the secondary device that the user of the secondary device is to be cleared away from the cooperative network. The foregoing verification and clearing operations are performed by the local secondary device, and the local secondary device transfers an updating status to the primary device, to update a user list. If the user of the secondary device comes back to a room, the user of the secondary device may rejoin the cooperative network, with reference to the foregoing networking mode.

Sound Pickup

Cooperative sound recording is used as an example. In the cooperative network, when a secondary device has finished local sound pickup in a frame-by-frame manner, or after a secondary device has sent data frames to the primary device after signal strength of the secondary device is enhanced, a current memory segment is cleared.

Alternatively, the primary device receives a data frame transferred by a secondary device, and writes the data frame into a private file in a private folder or into an encrypted file. Another application or process cannot access the folder. A path of the private folder can be generated at any time, and cannot be easily accessed by a user.

In a process such as a cooperative playing or sound recording process, a recorder built in a phone or another process or a third-party APP that requires a response from a microphone is locked.

If a recording pen software manner is used, on a main interface of recording pen software, the primary device shares a sound recording instruction icon to a group. When the sound recording instruction icon on a secondary device is clicked, time synchronization between the primary device and the secondary device is completed. After the synchronization is completed, sound pickup on the primary device is clicked. Then the primary device and the secondary device may simultaneously perform, based on the sound channels determined in the network access phase and a start time after the synchronization, multi-device cooperative sound recording; and the secondary device begins to transmit local sound pickup and processing data to the primary device.

[Assuming that Members of the Cooperative Network are in a Same Physical Area, for Example, in a Same Room]

Generally, it is assumed that the members of the cooperative network are in a same room during local recording. Therefore, embodiments of the present invention only describes in detail a case in which the members of the cooperative network are in a same physical area. For a case in which the members of the cooperative network are in a plurality of areas, refer to the examples of sound playing.

Cooperative sound recording is used as an example. In a cooperative sound recording process, a secondary device forwards a local-recording sound channel (if it is multi-channel recording) to the primary device after corresponding signal processing (for example, noise reduction) is performed on the local-recording sound channel. After the secondary device performs sound recording in a frame-by-frame manner, a current memory segment is cleared. The processing mechanism may be frame-based processing, or processing upon completion of the sound recording.

Alternatively, the secondary device writes recording data into a private file in a private folder, or into a hidden folder, or into an encrypted file. Another application or process cannot access the folder. A path of the private folder can be generated at any time, and cannot be easily accessed by a user. After the entire recording is complete, the recording data is sent to the primary device.

In any one of the foregoing forms, when receiving the recording data, the primary device writes the data into a private file in a private folder, or into a hidden folder, or into an encrypted file. Another application or process cannot access the folder. A path of the private folder can be generated at any time, and cannot be easily accessed by a user.

In the cooperative sound recording process, a recorder built in a phone or another process or a third-party APP that requires a response from a microphone is locked.

In the sound recording process, a user of the secondary device may synchronously perform an application, such as checking an email or browsing a web page. However, if the user needs to leave a current environment because of answering an incoming call or due to another reason, a distance detection process is started. Related information is periodically transferred between the primary device and the secondary device. A specific solution includes: mapping, through the network, a delay to a WiFi strength parameter or a distance parameter. When WiFi strength is weaker than a predefined threshold or the distance parameter is greater than a predefined threshold, a content clearing mechanism is started and specifically includes: accessing a private file in a private folder, or a hidden folder, or an encrypted file (including a case in which a path of the folder can be generated at any time), and deleting a sound recording file already stored locally into the secondary device; and then deleting information such as a WiFi password left during the networking, and prompting the user of the secondary device that the user of the secondary device is to be cleared away from the cooperative network. If the user of the secondary device comes back to a room, the user of the secondary device may rejoin the cooperative network, with reference to the foregoing networking mode.

Another security assurance is oriented to the secondary device, regardless of cooperative sound playing, or cooperative sound recording, or another cooperation function. In particular, the secondary device grants particular permission (for example, invoking a microphone or a loudspeaker) to the primary device, but this is limited to only sound pickup or sound playing. A corresponding message mechanism is also limited to only the sound pickup or sound playing function. Another process requirement from the primary device is directly shielded.

Phase 3: Network Removal Phase

After a cooperative application ends, all information about a current connection of the primary device and the secondary device, including a WiFi password, is deleted; and a private file in a private folder, or a hidden folder, or an encrypted file (including a case in which a path of the folder can be generated at any time) is accessed, and a sound recording file already stored locally into the secondary device is deleted. Network establishment needs to be performed again even if a current user wants to start a new process. This is equivalent to starting a brand-new process again.

In particular, in a sound recording scenario, before sound recording ends, a voice prompt is given or a prompt is given on an interface, to prompt a user to upload a voice memo to a cloud server. Then all information about a current connection of the primary device and the secondary device, including a WiFi password and a private folder in which a sound recording file or a playing file is stored, is automatically and thoroughly cleared. Network establishment needs to be performed again even if a current user wants to start a new process. This is equivalent to starting a brand-new process again.

In the embodiments of this application, the sequence numbers of the foregoing processes do not mean execution sequences. The execution sequences of the processes should be determined according to functions and internal logic of the processes, but should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. In an example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a terminal device. Certainly, the processor and the storage medium may exist as discrete components in a terminal device.

The foregoing embodiments each may be implemented completely or partially by using software, hardware, firmware, or any combination thereof. When software is used to implement the embodiment, the embodiment may be implemented completely or partially in a form of a computer program product. The computer program product includes one or more computer instructions. When the computer program instruction is loaded and executed on a computer, some or all of the procedures or functions according to this application are generated. The computer may be a general-purpose computer, a special-purpose computer, a computer network, or another programmable apparatus. The computer instruction may be stored in a computer readable storage medium, or may be transmitted by using the computer readable storage medium. The computer instruction may be transmitted from a website, computer, server, or data center to another website, computer, server or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

What is claimed is:

1. A method for secure multi-terminal cooperative working, comprising:
    when a first terminal device of a plurality of terminal devices of a network accesses the network, determining, by the first terminal device, a security mechanism;
    obtaining, by the first terminal device, cooperative working information played and/or recorded by the plurality of terminal devices;
    performing, by the first terminal device, security processing on the cooperative working information based on the security mechanism, wherein the security mechanism is used to prohibit a process other than a cooperative working process from accessing the cooperative working information;
    detecting, by the first terminal device, a distance between the first terminal device and a second terminal device, wherein the first terminal device is a secondary terminal device and the second terminal device is a primary terminal device in the plurality of terminal devices; and
    when the distance between the first terminal device and the second terminal device is greater than a preset distance threshold, deleting, by the first terminal device, the cooperative working information.

2. The method according to claim 1, wherein the performing, by the first terminal device, security processing on the cooperative working information based on the security mechanism comprises:
    storing, by the first terminal device, the cooperative working information into a secure folder that cannot be read by a process other than the cooperative working process, wherein the security mechanism is a manner of storing the cooperative working information.

3. The method according to claim 1, further comprising:
    prohibiting, by the first terminal device, a process other than the cooperative working process from forwarding the cooperative working information.

4. The method according to claim 1, wherein the performing, by the first terminal device, security processing on the cooperative working information based on the security mechanism comprises:
    after a first frame in the cooperative working information is sent or played, immediately deleting the first frame.

5. The method according to claim 1, further comprising:
    detecting, by the first terminal device, signal strength of the network; and
    when the signal strength of the network is less than or equal to a preset strength threshold, deleting, by the first terminal device, the cooperative working information.

6. The method according to claim 1, further comprising:
    receiving, by the first terminal device, a first exit command sent by a third terminal device, wherein the first terminal device is a secondary terminal device and the third terminal device is a primary terminal device in the plurality of terminal devices; and
    deleting, by the first terminal device, the cooperative working information based on the first exit command.

7. The method according to claim 1, further comprising:
    determining, by the first terminal device, that a fourth terminal device is about to leave a cooperative working area in which the plurality of terminal devices perform cooperative playing and/or cooperative recording; and
    sending, by the first terminal device, a second exit command to the fourth terminal device based on that the fourth terminal device is about to leave the cooperative working area, wherein the second exit command is used to instruct the fourth terminal device to delete the cooperative working information.

8. The method according to claim 1, further comprising:
    obtaining, by the first terminal device, a third exit command, wherein the third exit command is used to instruct a fifth terminal device to exit the network; and
    sending, by the first terminal device, a fourth exit command to the fifth terminal device based on the third exit command, wherein the fourth exit command is used to instruct the fifth terminal device to delete the cooperative working information.

9. The method according to claim 1, further comprising:
receiving, by the first terminal device, incoming call indication information; and
deleting, by the first terminal device, the cooperative working information based on the incoming call indication information.

10. An apparatus for secure multi-terminal cooperative working, comprising:
a processing unit configured to: when the apparatus accesses a network, determine a security mechanism, the network having a plurality of terminal devices performing cooperative playing and/or cooperative recording;
an obtaining unit configured to: obtain cooperative working information played and/or recorded by the plurality of terminal devices;
wherein the processing unit is further configured to: perform, based on the security mechanism, security processing on the cooperative working information obtained by the obtaining unit, wherein the security mechanism is used to prohibit a process other than a cooperative working process from accessing the cooperative working information;
wherein the processing unit is further configured to:
detect a distance between the apparatus and a second terminal device, wherein the apparatus is a secondary terminal device, and the second terminal device is a primary terminal device; and
when the distance between the apparatus and the second terminal device is greater than a preset distance threshold, delete the cooperative working information.

11. The apparatus according to claim 10, wherein the processing unit is further configured to:
store the cooperative working information into a secure folder that cannot be read by a process other than the cooperative working process, wherein the security mechanism is a manner of storing the cooperative working information.

12. The apparatus according to claim 10, wherein the processing unit is further configured to:
prohibit a process other than the cooperative working process from forwarding the cooperative working information.

13. The apparatus according to claim 10, wherein the processing unit is configured to:
after a first frame in the cooperative working information is sent or played, immediately delete the first frame.

14. The apparatus according to claim 10, wherein the processing unit is further configured to:
detect signal strength of the network; and
when the signal strength of the network is less than or equal to a preset strength threshold, delete the cooperative working information.

15. The apparatus according to claim 10, wherein the processing unit is further configured to:
receive, through the obtaining unit, a first exit command sent by a third terminal device, wherein the apparatus is a secondary terminal device and the third terminal device is a primary terminal device in the plurality of terminal devices; and
delete the cooperative working information based on the first exit command.

16. The apparatus according to claim 10, wherein the processing unit is further configured to:
determine that a fourth terminal device is about to leave a cooperative working area in which the plurality of terminal devices perform cooperative playing and/or cooperative recording; and
send a second exit command to the fourth terminal device based on that the fourth terminal device is about to leave the cooperative working area, wherein the second exit command is used to instruct the fourth terminal device to delete the cooperative working information.

17. The apparatus according to claim 10, wherein the processing unit is further configured to:
obtain a third exit command by using the obtaining unit, wherein the third exit command is used to instruct a fifth terminal device to exit the network; and
send a fourth exit command to the fifth terminal device based on the third exit command, wherein the fourth exit command is used to instruct the fifth terminal device to delete the cooperative working information.

18. The apparatus according to claim 10, wherein the processing unit is further configured to:
receive incoming call indication information by using the obtaining unit; and
delete the cooperative working information based on the incoming call indication information.

* * * * *